United States Patent [19]

Walter

[11] Patent Number: 4,477,996
[45] Date of Patent: Oct. 23, 1984

[54] VARIABLE WEIGHT CASTING DEVICE

[76] Inventor: Richard Walter, 2951 Holiday Dr., Morgan Hill, Calif. 95037

[21] Appl. No.: 484,175

[22] Filed: Apr. 12, 1983

[51] Int. Cl.³ .............................................. A01K 91/00
[52] U.S. Cl. .................................... 43/43.14; 43/42.06
[58] Field of Search ................... 43/43.14, 43.1, 42.06, 43/42.22

[56] References Cited

U.S. PATENT DOCUMENTS

| | | | |
|---|---|---|---|
| 829,608 | 8/1906 | Stanton | 43/43.1 |
| 3,688,431 | 9/1972 | Nichols | 43/43.14 |
| 3,820,270 | 6/1974 | La Force | 43/43.14 |
| 3,852,906 | 12/1974 | La Force | 43/43.14 |
| 3,990,172 | 11/1976 | Hagquist | 43/43.14 |

*Primary Examiner*—Gene P. Crosby
*Attorney, Agent, or Firm*—Thomas Schneck

[57] ABSTRACT

A variable weight casting device has a hollow central bore of varying diameters for retention of a fishing line with a weight selected from weights of different density by which the casting device achieves a range for surface or depth fishing.

9 Claims, 6 Drawing Figures

VARIABLE WEIGHT CASTING DEVICE

DESCRIPTION

1. Technical Field

The present invention relates to casting devices for fishing and more particularly to a casting device capable of retaining weights for variable depth fishing.

2. Background Art

Certain fishing floats of the prior art are of hollow construction with a partly removable pin so that the float can be partially filled with water to reduce buoyancy. In order to cast a hook and leader further into deeper water, it is the custom to add various lead weights to the fishing line. Other prior art floats require a line spool for releasing predetermined lengths of line after the float hits the water surface since the floats were not designed to submerge to reach deeper water. Such line release floats require resetting of the leader line on a spool prior to each cast.

An object of the invention is to provide a one piece, low-cost variable weight casting device for easy attachment to a fishing line, and in which weights may be retained to effect a higher density so that the device and leader line may both sink to a greater depth if desired.

DISCLOSURE OF INVENTION

The above object has been met by a one piece molded rubber device having an annularly ribbed hollow central bore providing for retention of fishing line and weights. The device achieves a variable density or specific gravity by providing a buoyant float body with a central bore for passage of the line therethrough. Selected density weights are shaped as retainer members for holding the line in place. When heavier weights are held by the ribs in the central bore, the device and retained line sinks below the surface in a vertical position presenting a larger surface to current flow, allowing it to drift with water currents.

For use on the surface, a low density retainer member is used in the bore to hold the line in place against the ribs in the central bore and the device floats, maintaining a horizontal position on the water surface drifting with the water current, trailing the leader line and hook. The device is made of semi-transparent resilient material which is nearly invisible in the water. When submerged by a higher density retainer member, the device can bounce off bottom rocks while retaining a vertical position.

BEST MODE FOR CARRYING OUT THE INVENTION

Figure 1:
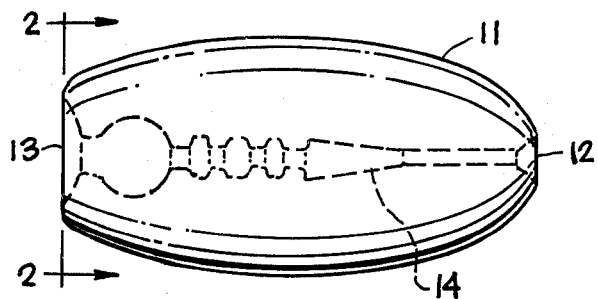
FIG. 1 is a side elevation of the variable weight casting device of the present invention.

FIG. 1 shows the shape of the casting device 11, tapered to a narrow front end 12 and a wider back end 13. The longitudinal axial position of the line and weight retaining bore 14 is indicated by the dotted line in FIG. 1.

Figure 2:
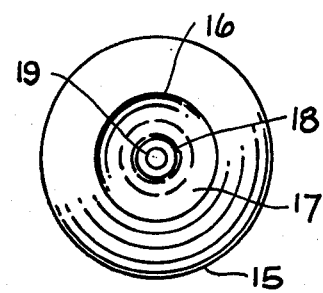
FIG. 2 is an end view of the invention taken along lines 2—2 of FIG. 1.

FIG. 2 is an end view taken along line 2—2 of FIG. 1 showing the circular shaped walls 15 of the casting device and the varying diameters of the inner chambers of the central bore 14. A tapered lip flange 16 opens into a wide diameter spherical groove 17 which ends at the radially inwardly projecting rib 18. The ribbed section of the bore terminates at the narrower diameter of the bore wall 19 just prior to the entry port of the bore.

Figure 3:
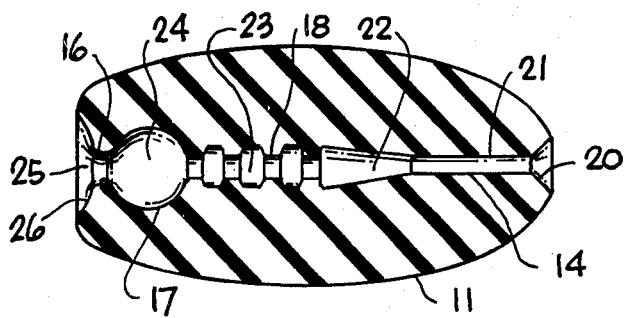
FIG. 3 is a side cut away view of the apparatus of FIG. 1.

With reference to FIG. 3, the internal structure of the casting device 11 is shown, having a narrow beveled entry port 20 to the central bore 14. The bore has a narrow diameter section 21 extending approximately one-third of the length of the bore. The bore then widens 22 into a section 23 in which annular ribs 18 extend radially into the bore. In the final section 24 the bore enlarges into a spherically shaped groove 17 culminating in a narrower diameter lip flange 16 forming an exit port 25 at the exit of the bore. The lip flanges form a concave surface 26 at the back end 13.

The diameter of the section 21 of the bore is at least of a diameter to hold a fishing line and the entry 20 is tapered to allow easy placement of a fishing line through the bore 14 of the casting device 11.

The casting device is molded in one piece. The preferred embodiment employs a low-density thermoplastic rubber which cures to a semi-transparent appearance. A typical material is Kraton, a trademark of Shell Oil. The material used should retain its shape under temperature variation and compression and should be slightly less dense than water.

The device can be attached to the fishing line just prior to attachment of a swivel connecting a leader line and hook. During casting of the line, the casting device acts as an egg shaped aerodynamic weight on the line during flight aiding in placement of the hook at a distance from the fisherman.

Since the fishing line is connected to the device just prior to the short line leader and hook, it is possible to cast the device and hook into deep water and when finished to reel in the entire line up to the short leader line without the necessity of having a release on the line connection or prior winding a length of line on a spool for line release in deeper water such as would be required for the prior art line release means for deeper water fishing.

Figure 4:
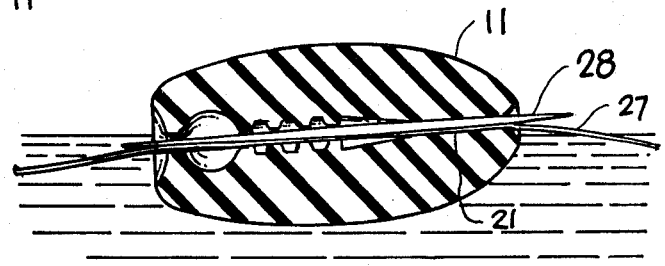
FIG. 4 is a side cut away view of the invention used as a surface float.

For use, the fishing line 27 is inserted in the casting device through the entry port 20 of the central bore 14, exiting out port 25. For surface water fishing, a thin buoyant stick 28, such as a round toothpick, slightly longer than the length of the float is inserted through the bore to form a line retainer by wedging against the narrow wall of bore section 21 as shown in FIG. 4. Due to the buoyancy of the device material, which is less dense than water, it will float on the water surface drifting with the current flow trailing the fishing line leader and hook. No other means are required to hold the line in the device due to the resilient nature of the device material which is compressed against the line by the presence of the inserted stick.

Figure 5:
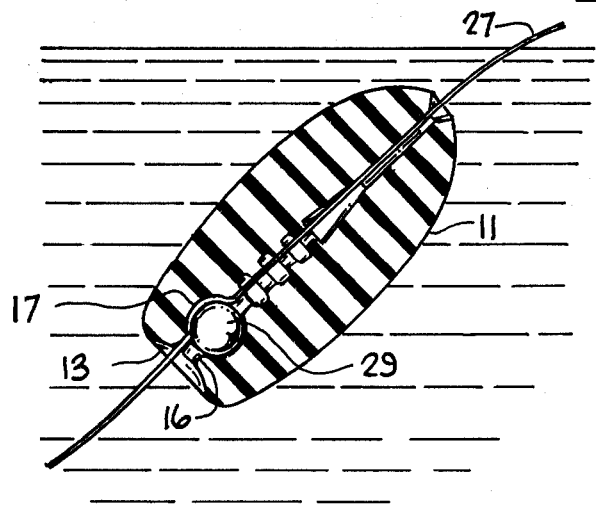
FIGS. 5 and 6 are side cut away views of the invention used at lower depths.

For deeper water fishing, the casting device behaves like a sinker or heavier weight by the insertion of either a dense pin or a round weight such as a lead split-shot 29 into the spherically shaped groove 17 as shown in FIG. 5. The shot, held in the groove by the lip 16, compresses the wall against the fishing line 27 retaining it in place. The presence of the additional weight at the base 13 of the device forces it into a vertical position below the water surface to a depth determined by the weight of the split shot size. Due to the compressibility of the device material, shot will be held within the groove in a line retaining position. Small shot sizes may be crimped to the line for line retention in the device. The vertical position of the weighted device presents a larger surface to the current flow causing it to drift with the flow trailing the leader line and hook.

Figure 6:
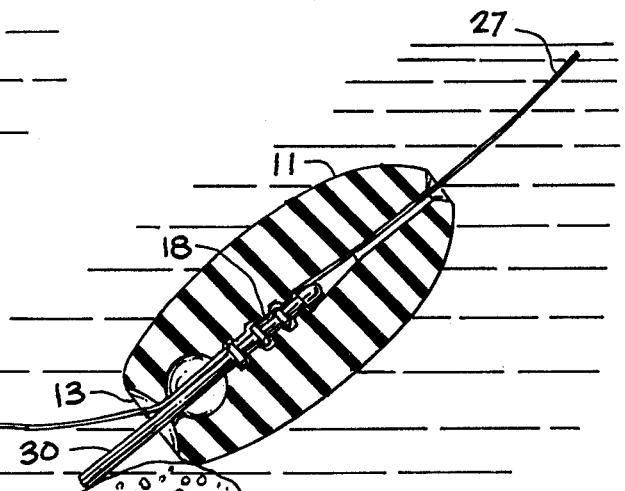

Because of the vertical position and line 27 exiting the top of the float at 12 the float has leverage when it is held against rocks by current and this lever action swings float up and away from obstacles when line pressure is exerted at 12 by line 27. When fishing for fish such as steelhead in faster flowing water or for bottom fishing, it is possible, due to the construction of the ribs in the mid section of the bore, to insert lengths of various diameters of denser pencil lead weights 30 into the bore of the device for retention with the fishing line 27 by the annular inwardly radially extending ribs 18 as shown in FIG. 6. The compressibility of the material allows insertion of different diameter leads while maintaining contact with the ribs. Diameters of the pencil lead may range from ⅛ inch to ¼ inch. The increased weight will lessen the buoyancy of the device causing it to drift with the current flow at the bottom of the water, more weight being used for faster moving or deeper water. The resilient material of the device and the leverage action causes it to bounce upon contact with bottom rocks thus avoiding the normal hang up and snagging on rocks of previously used lead weights. The weighted base of the device 13 forces it back to a vertical position with little tumbling or rolling action.

The resiliency of the device material allows different size lead split-shots and pencil leads to be inserted since the original shape is almost completely regained after compression by the weights. For this reason, the same variable weight casting device may be used for surface or depth fishing by the addition of the appropriate weight and without any additional line release mechanism since the weighted device brings the short leader line down into deeper water.

The drifting action of the variable weight casting device caused by the vertical surface resistance against the current flow direction presents a more natural drifting action than the dead weight of the high density weights placed above or below the hooks as used in the prior art. The direction of line can be reversed for surface fishing allowing the fisherman to take advantage of the concave lip 26 and cavity 17.

This lip will produce a popping or gurgling sound when the float is pulled across the water's surface butt first by a short jerking action from the fisherman.

This sound is very attractive to some types of fish especially in early and late hours.

I claim:

1. A variable weight casting device comprising, a buoyant body having a longitudinal central bore defining a chamber, said chamber having openings to the front and back ends of said body for insertion of a fishing line therethrough, said bore having internal ribs extending radially inward in the inner wall of said chamber, and a replaceable weight selected from weights with each having a different density, said replaceable weight being lodged in said chamber for retention of said fishing line by pressure of said weight on said ribs wherein the buoyancy of said device is affected.

2. The device of claim 1 wherein said replaceable weight is at least the same density as that of said body thereby allowing said body to maintain a horizontal position floating on the water surface.

3. The device of claim 1 wherein said replaceable weight is of greater density than that of said body thereby causing it to lose buoyancy.

4. A variable weight casting device comprising, a single piece buoyant elongated body, said body having an axial central bore forming a passageway, said bore having annular ribs for retention of fishing line by means of a weight, said weight being selected from weights of different density for insertion in said passageway whereby the buoyancy of said device is adjusted to sink the device through various water levels controlling the speed of drifting and the depth of fishing.

5. The device of claim 4 wherein said line retention with said weight is achieved with lead shot whereby the device loses buoyancy.

6. The device of claim 4 wherein said line retention with said weight is achieved with pencil lead whereby the device loses buoyancy.

7. A variable weight casting device comprising, a buoyant elongated body of compressible material having a lengthwise cylindrical bore, said bore opening at both ends of said body with a narrow diameter culminating in a narrow opening at the front of said body, a wider diameter with spaced apart annular ribs at the middle of said body, and a deeper spherical groove at the rear end of said body, terminating in a lip forming a larger opening at the back of said body, said ribs and groove providing means whereby retainer members may be inserted to compress against a fishing line passing through the bore.

8. The device of claim 7 wherein said retainer members are of high density material so as to add weight to the body and lower it vertically under the water surface.

9. A variable weight casting device comprising, a semi-transparent, soft-plastic, buoyant, elongated body having a lengthwise hollow central bore, said bore having a wider opening at a base region than at a top region thereof, a large diameter spherical groove in the bore proximate to said wider base opening, a plurality of annular spaced apart ribs of smaller diameter midway in the bore, culminating in a smooth wall bore narrowing to a small diameter opening at the top region of the bore, said base region opening and top region opening being of a size to allow passage of a fishing line through said bore, said ribs and groove being of a size to cause retention of a line fastening means in said bore, wherein said line fastening means consists of weights of various densities affecting the buoyancy of the device.

* * * * *